United States Patent
Moseley (10) Patent No.: US 8,248,214 B2
(45) Date of Patent: Aug. 21, 2012

(54) ADJUSTABLE LIGHTING FOR DISPLAYING PRODUCTS

(75) Inventor: Don A. Moseley, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 1744 days.

(21) Appl. No.: 11/457,075

(22) Filed: Jul. 12, 2006

(65) Prior Publication Data

US 2008/0012722 A1 Jan. 17, 2008

(51) Int. Cl.
*H04Q 5/22* (2006.01)

(52) U.S. Cl. .................. 340/13.25; 340/10.1; 340/13.26

(58) Field of Classification Search .............. 340/825.69, 340/10.1, 815.4, 815.65, 572.4, 539.16, 13.25, 340/13.26, 815.56, 539.1; 315/307, 308
See application file for complete search history.

(56) References Cited

U.S. PATENT DOCUMENTS

| | | | |
|---|---|---|---|
| 2,360,362 A | 10/1944 | Orosz | |
| 4,225,808 A | 9/1980 | Saraceni | |
| 4,355,309 A | 10/1982 | Hughey et al. | |
| 4,381,876 A | 5/1983 | Fenwick | |
| 4,598,341 A | 7/1986 | Brackhahn et al. | |
| 5,120,116 A | 6/1992 | Amstutz et al. | |
| 5,626,028 A | 5/1997 | Graat et al. | |
| 5,879,070 A | 3/1999 | Severloh | |
| 6,174,073 B1 | 1/2001 | Regan et al. | |
| 6,278,887 B1 * | 8/2001 | Son et al. | 455/566 |
| 6,325,523 B1 | 12/2001 | Santosuosso et al. | |
| 6,548,967 B1 | 4/2003 | Dowling et al. | |
| 6,822,551 B2 * | 11/2004 | Li et al. | 340/5.1 |
| 6,900,735 B2 | 5/2005 | Guerrieri et al. | |
| 6,930,455 B2 | 8/2005 | Chansky et al. | |
| 7,152,040 B1 * | 12/2006 | Hawthorne et al. | 705/16 |
| 2002/0109980 A1 | 8/2002 | Santosuosso et al. | |
| 2003/0069811 A1 * | 4/2003 | Ximenes et al. | 705/27 |
| 2003/0133292 A1 | 7/2003 | Mueller et al. | |

(Continued)

FOREIGN PATENT DOCUMENTS

JP 2005183050 7/2005

OTHER PUBLICATIONS

Mark Lien; "Energy Solutions"; Article, Second Issue; 2004; pp. 9-11.

*Primary Examiner* — Brian Zimmerman
*Assistant Examiner* — Yong Hang Jiang
(74) *Attorney, Agent, or Firm* — Alicia L. W. Brewster, Esq.; Troutman Sanders LLP (57) ABSTRACT

A system and method for controlling a variable light source where a variation in the light source can be triggered by utilizing a product identifier, such as for example RFIDs associated with the product being displayed to tell the controller to control the variable display case lighting to vary its color/intensity to change the lighting to best showcase the product; or utilizing UPC codes, scanned using a handheld device to accomplish the same objective; or utilizing motion/infrared/ultrasonic sensors particularly when lighting is to be turned off to conserve on power consumption. For example, red meat and poultry each may require their respective different lighting to be best displayed; thus red meat products may have a different RFID than poultry items; and gold jewelry items may have a different RFID than sterling silver jewelry items.

24 Claims, 3 Drawing Sheets

U.S. PATENT DOCUMENTS

| | | |
|---|---|---|
| 2004/0222306 A1 | 11/2004 | Fajarillo |
| 2005/0030744 A1 | 2/2005 | Ducharme et al. |
| 2005/0151489 A1* | 7/2005 | Lys et al. .................. 315/308 |
| 2005/0258961 A1* | 11/2005 | Kimball et al. ............ 340/572.1 |
| 2005/0264401 A1 | 12/2005 | Haller et al. |
| 2005/0265019 A1 | 12/2005 | Sommers et al. |
| 2005/0275541 A1 | 12/2005 | Sengupta et al. |
| 2006/0028822 A1* | 2/2006 | Tanamachi et al. ........... 362/293 |

\* cited by examiner

ADJUSTABLE LIGHTING FOR DISPLAYING PRODUCTS

BACKGROUND OF INVENTION

1. Field of Invention

This invention relates generally to adjustable lighting and, more particularly, to adjustable lighting for displaying products in a retail environment.

2. Background Art

Various types of lighting sources are utilized in retail environments in areas where products are displayed including, for example, various lighting sources are utilized in display cases, such as for example fluorescent or LED lighting. The color of the lighting or the color temperature of white light may effect how a product appears. One type of lighting is a light-emitting diode (LED) which is a semiconductor device that emits incoherent narrow-spectrum light when electrically biased in the forward direction. This effect is a form of electroluminescence. The color of the emitted light depends on the chemical composition of the semiconducting material used, and can be near-ultraviolet, visible or infrared LED lighting.

An LED is a special type of semiconductor diode. Like a normal diode, it consists of a chip of semiconducting material impregnated, or doped, with impurities to create a structure called a p-n junction. As in other diodes, current flows easily from the p-side, or anode to the n-side, or cathode, but not in the reverse direction. Charge-carriers—electrons and holes-flow into the junction from electrodes with different voltages. When an electron meets a hole, it falls into a lower energy level, and releases energy in the form of a photon as it does so.

The wavelength of the light emitted, and therefore its color, depends on the bandgap energy of the materials forming the p-n junction. In silicon or germanium diodes, the electrons and holes recombine by a non-radiative transition which produces no optical emission, because these are indirect bandgap materials. The materials used for an LED have a direct bandgap with energies corresponding to near-infrared, visible or near-ultraviolet light.

LED development began with infrared and red devices made with gallium arsenide. Advances in materials science have made possible the production of devices with ever shorter wavelengths, producing light in a variety of colors. LED lights are a very versatile low engery lighting that provides sufficient intensity in various colors.

Lighting systems are used to illuminate display cases as well as other retail display areas, such as commercial refrigeration units and displays, as well as other display cases that need not be refrigerated. Fluorescent tubes are quite often used to illuminate products disposed in a display case or some other open display area in a retail store. However, fluorescent tubes do not last nearly as long as a typical LED and consume more power than LEDs. Furthermore, for refrigerated display cases, initiating the required arc to illuminate a fluorescent tube can be difficult in a refrigerated compartment. Also, LEDs have more flexibility in color choice and color temperature for white light without the use of color filters.

The selection for color of lighting and even the color temperature of white light is important when displaying a product because the color of display lighting can effect the appearance of an item on display. White light is typically utilized to display products in a retail environment, however, even various white light sources will have various color temperature or color hues.

"White light" is commonly described by its color temperature. A traditional incandescent light source's color temperature is determined by comparing its hue with a theoretical, heated black-body radiator. The lamp's color temperature is the temperature in kelvins at which the heated black-body radiator matches the hue of the lamp.

How human beings perceive objects can be effected by the light source and the associated color of the light source. Many retailers are accustomed to controlling the lighting source and corresponding color in a product display environment. Retailers often times attempt to engineer the lighting environment inside a structure to emulate an ideal and a perfect set of lighting conditions to best display a given product. However, different products display better under different lighting conditions, thus it is difficult to find one lighting that will work for all types of products.

The desire to control the properties of light in an artificial environment is easy to understand. Humans are primarily visual creatures. The human eye requires light to see by and our eyes are particularly sensitive to color. Therefore, a given product may appear to be more appealing to the human eye when displayed under certain light conditions. However, the configuration and placement of products in a retail environment changes often, but it can be difficult to change the lighting in a given environment every time a product configuration changes.

Visible light is a collection of electromagnetic waves (electromagnetic radiation) of different frequencies, each wavelength of which represents a particular "color" of the light spectrum. Visible light is generally thought to comprise those light waves with wavelength between about 400 nm and about 700 nm. Each of the wavelengths within this spectrum comprises a distinct color of light from deep blue/purple at around 400 nm to dark red at around 700 nm. Mixing these colors of light produces additional colors of light. The distinctive color of a neon sign results from a number of discrete wavelengths of light. For example, these wavelengths combine additively to produce the resulting wave or spectrum that makes up a color. One such color is white light.

Because of the importance of white light, and since white light is the mixing of multiple wavelengths of light, there have arisen multiple techniques for characterization of white light that relate to how human beings interpret a particular white light. The first of these is the use of color temperature, which relates to the color of the light within white. Correlated color temperature is characterized in color reproduction fields according to the temperature in degrees Kelvin (K) of a black body radiator that radiates the same color light as the light in question. The color temperature of viewing light depends on the color content of the viewing light.

The second classification of white light involves its quality. In 1965 the Commission Internationale de l'Eclairage (CIE) recommended a method for measuring the color rendering properties of light sources based on a test color sample method. This method has been updated and is described in the CIE 13.3-1995 technical report "Method of Measuring and Specifying Colour Rendering Properties of Light Sources,". In essence, this method involves the spectroradiometric measurement of the light source under test. This data is multiplied by the reflectance spectrums of eight color samples. The resulting spectrums are converted to tristimulus values based on the CIE 1931 standard observer. The shift of these values with respect to a reference light are determined for the uniform color space (UCS) recommended in 1960 by the CIE. The average of the eight color shifts is calculated to generate the General Color Rendering Index, known as CRI.

Artificial lighting generally uses the standard CRI to determine the quality of white light. If a light yields a high CRI compared to full spectrum white light then it is considered to generate better quality white light (light that is more "natural" and enables colored surfaces to be better rendered). This method has been used since 1965 as a point of comparison for all different types of light sources.

Current lighting technology makes such adjustment and control difficult, because common sources of light, such as halogen, incandescent, and fluorescent sources, generate light of a fixed color temperature and spectrum. Further, altering the color temperature or spectrum will usually alter other lighting variables in an undesirable way. For example, increasing the voltage applied to an incandescent light may raise the color temperature of the resulting light, but also results in an overall increase in brightness.

In artificial lighting, control over the range of colors that can be produced by a lighting fixture is desirable. Many lighting fixtures known in the art can only produce a single color of light instead of range of colors. That color may vary across lighting fixtures (for instance a fluorescent lighting fixture produces a different color of light than a sodium vapor lamp). The use of filters on a lighting fixture does not enable a lighting fixture to produce a range of colors, it merely allows a lighting fixture to produce its single color, which is then partially absorbed and partially transmitted by the filter. Once the filter is placed, the fixture can only produce a single (now different) color of light, but cannot produce a range of colors.

In control of artificial lighting, it is further desirable to be able to specify a point within the range of color producible by a lighting fixture that will be the point of highest intensity. An incandescent light fixture can produce a range of colors, but the intensity necessarily increases as the color temperature increases which does not enable control of the color at the point of maximum intensity. Filters can be used but lack control of the point of maximum intensity, as the point of maximum intensity of a lighting fixture will be the unfiltered color (any filter absorbs some of the intensity).

The correlated color temperature, and CRI, of viewing light can affect the way in which an observer perceives a color image of a product on display. An observer will perceive the same color image of the product differently when viewed under lights having different correlated color temperatures. For example, a color image of a product, which looks normal when viewed in early morning daylight will look bluish and washed out when viewed under overcast midday skies. Further, a white light with a poor CRI may cause colored surfaces to appear distorted.

Applicants have further appreciated that the color temperature of ambient light affects how viewers perceive a display, such as a retail or marketing display, by changing the perceived color of such items as foods, clothing apparel, furniture, jewelry and other products containing visual elements that can greatly affect how people view and react to such displays. Variations in the color temperature of lighting can affect how appealing or attractive such a display may be to customers.

Moreover, the ability to view a decoratively patterned or colored item in a lighting environment or color temperature condition which matches or closely approximates the conditions under which the item will normally be viewed would permit such colored items to be more accurately viewed. Typically, the lighting used in a retail display setting cannot be varied and is often chosen to highlight a particular facet of the color of the item leaving a purchaser to guess as to whether the item in question will retain an attractive appearance under the lighting conditions where the item will eventually be placed.

Various systems and methods for changing and/or generating and/or modulating illumination conditions to generate light of a desired and controllable color, for creating lighting fixtures for producing light in desirable and reproducible colors, and for modifying the color temperature or color shade of light produced by a lighting fixture within a specified range have been utilized. However, the products being displayed in open display areas or in the display cases in a retail environment may change frequently, which will require the retailer to implement a lighting adjustment to accommodate the different product type.

An automated system and method is needed to adjust the lighting in a display area or display case when product changes occur.

BRIEF SUMMARY OF INVENTION

The present invention is a system and method for controlling a variable light source in a retail environment where a variation in the light source can be triggered by utilizing a product identifier, such as for example RFIDs associated with the product being displayed to tell the controller to control the variable display case lighting to vary its color/intensity to change the lighting to best showcase the product; or utilizing UPC codes, scanned using a handheld device to accomplish the same objective; or utilizing motion/infrared/ultrasonic sensors particularly when lighting is to be turned off to conserve on power consumption. For example, red meat and poultry each may require their respective different lighting to be best displayed; thus red meat products may have a different RFID than poultry items; and gold jewelry items may have a different RFID than sterling silver jewelry items.

The controller can be communicably linked to a product identifier sensor, which reads the product identifier tag's signal to determine the product and the desired lighting for the product. The desired lighting can be determined by the controller using multiple methods, such as for example, the desired color can be encoded in the product identifier and read by the sensor and interpreted by the controller or the controller can utilize a look up table that contains the product type and the associated desired display color. Various types of lighting can be utilized; and one embodiment can utilize LED lighting because of its versatility. LED lighting can be white or can be various single colors or can be in an RGB package adjustable to various colors. LED lighting can be adjusted to change color to best showcase products. LED lighting has low power consumption. The color and color temperature of LED lighting is very controllable and stable. Use of LEDs also allows for a light source having an array of LEDs having varying colors, where a combination of a sub set from the array can provide the desired color.

One embodiment of the present invention is a system for controlling variations in display lighting based on a product being displayed comprising a product display area having a controllable color variable light source. A product identification tag sensor can be disposed proximate the product display area and can be operable to read product identifying information from a product identification tag located proximate the product display area and within the sensing range of the product identification tag sensor. The product identification tag can be associated with a specific product type, and said product identification sensor can have a sensor output signal representative of the product identifying information. A controller can be communicably linked to the color variable light source and can have a sensor input communicably linked to receive and interpret the sensor output signal and said controller can be operable to control the color variable light source to output a color of light responsive to the interpretation of the sensor output signal.

Another embodiment of the present invention is a method for controlling variations in display lighting based on a product being displayed comprising the steps of providing a controllable color variable light source in a product display area and disposing a product identification tag sensor proximate the product display area, where said product identification tag sensor is operable to read product identifying information from a product identification tag located proximate the product display area and within the sensing range of the product identification tag sensor, where the product identification tag is associated with a specific product type. The method can further comprise the step of outputting a sensor output signal representative of the product identifying information read from the product identification tag and receiving and interpreting the sensor output signal with a sensor input of a controller communicably linked to the color variable light source. The method can also include the step of controlling the color variable light source to output a color of light responsive to the interpretation of the sensor output signal.

The above embodiments provide a system and method for automatically adjusting the color of a light source when a different product is displayed in the display area. These and other advantageous features of the present invention will be in part apparent and in part pointed out herein below.

BRIEF DESCRIPTION OF THE DRAWINGS

For a better understanding of the present invention, reference may be made to the accompanying drawings in which.

DETAILED DESCRIPTION OF INVENTION

Figure 1A:
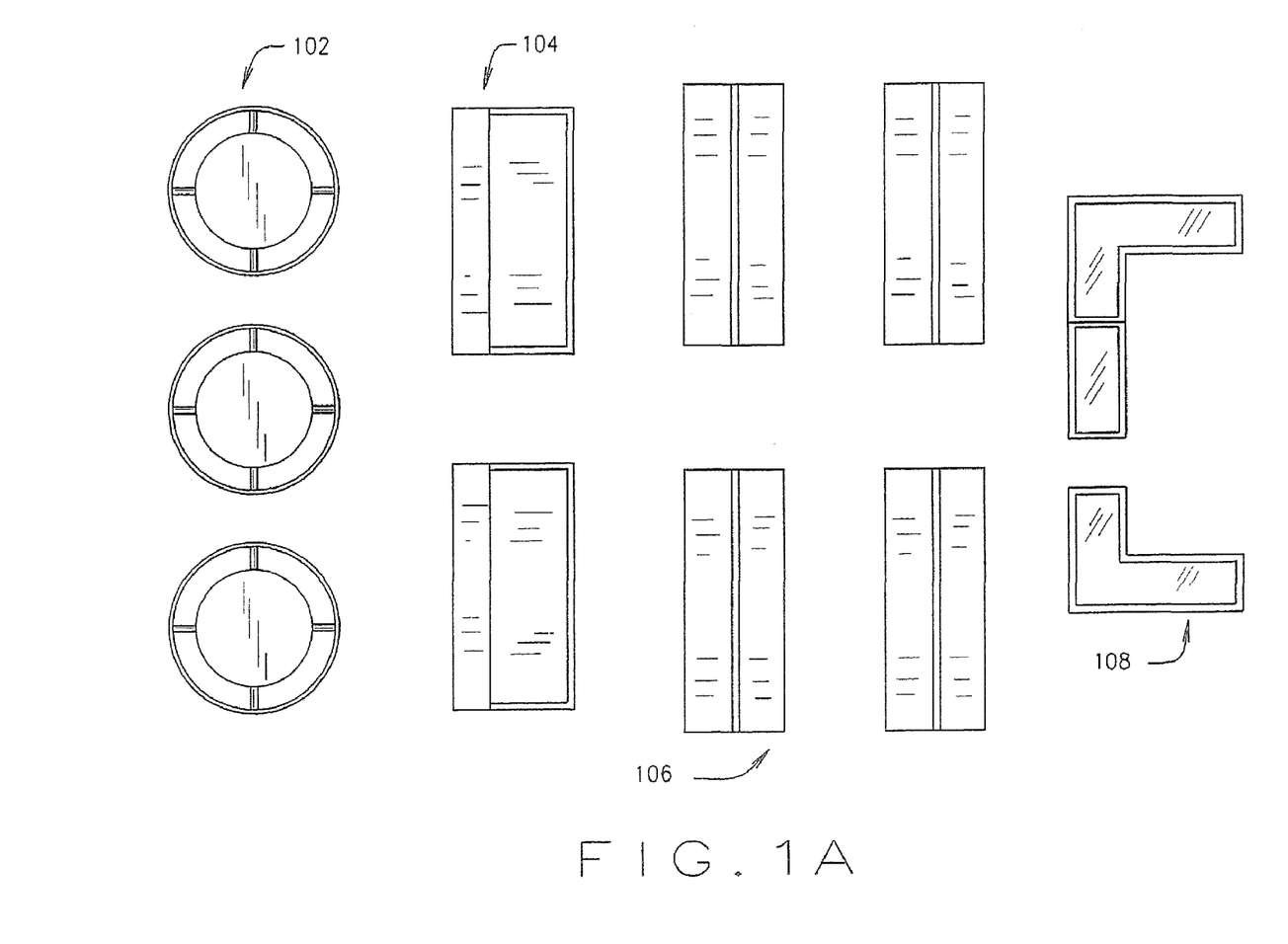
FIG. 1A is an illustration of a floor layout for a typical clothing and general non-food merchandise retail store is shown.
Figure 1B:
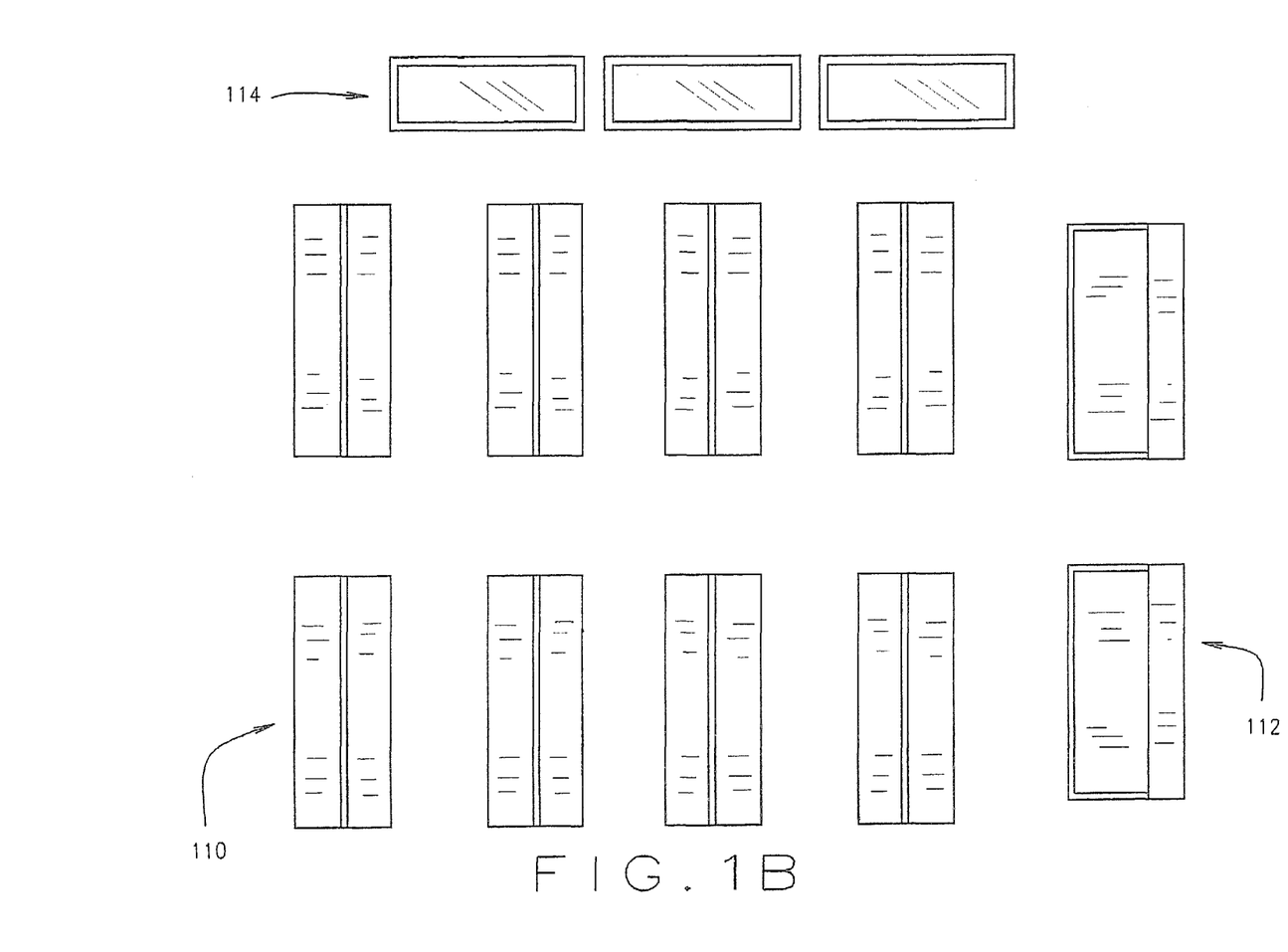
FIG. 1B is an overhead illustration of a floor layout of a typical food or grocery/produce retail store.
Figure 2:
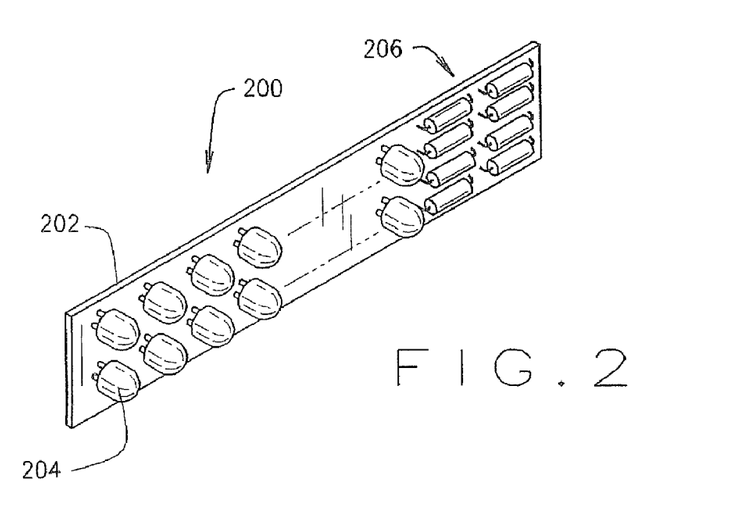
FIG. 2 is an embodiment of a light fixture.
Figure 3:
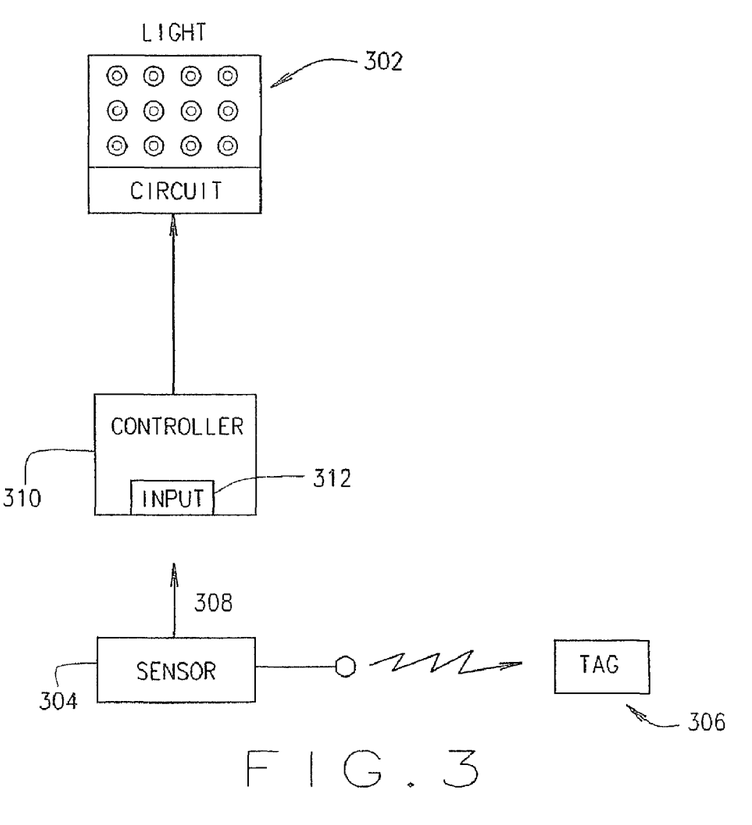
FIG. 3 is an illustration of an automated lighting control system.

According to the embodiment(s) of the present invention, various views are illustrated in FIGS. 1-3 and like reference numerals are being used consistently throughout to refer to like and corresponding parts of the invention for all of the various views and figures of the drawing. Also, please note that the first digit(s) of the reference number for a given item or part of the invention should correspond to the FIG. number in which the item or part is first identified.

One embodiment of the present invention comprising controllable variable lighting teaches a novel apparatus and method for controlling variable lighting in a retail environment to automatically adjust the color and/or color temperature of display lighting based on the product being displayed.

The details of the invention and various embodiments can be better understood by referring to the figures of the drawing. Referring to FIG. 1A and FIG. 1B, the overhead views are illustrative of typical retail store floor layouts. FIG. 1A is more illustrative of a typical clothing and general "non-food" merchandise retail store, where as FIG. 1B is more illustrative of a typical food or grocery/produce retail store.

In FIG. 1A, a clothing rack 102 and clothing table 104 areas are shown, merchandise shelving 106 areas are shown and display case areas 108 are shown. Depending on the change of products being displayed in these areas there may be a desire to automatically change the lighting in these areas when a new product is placed in the area so that the products can be given the best appearance possible. With the present invention the lighting in these various areas can be adjusted in intensity and in color. When a retail product is placed in one of the areas, such as for example in a display case 108, a product identification tag, such as for example an RFID product identification tag, associated with the product can emit a signal representative of the product's identification information and/or possibly a signal representative of the preferred light intensity and/or light color. A product identification tag sensor can be disposed within range to sense the signal and provide an output to a controller that has functional control logic and electronics to receive and interpret the signal and then control the lighting in the display area to vary its intensity and/or color.

As an example, there can be a retail area being reconfigured to house a new product and that retail area could be a jewelry display case where the jewelry being removed is costume jewelry such as beads and costume pearls and the new product being installed in the display case is 14 kt gold items. The gold items may display better under a different ambient light than the lighting for the costume jewelry. Therefore, a product identification tag can be associated with one or more of the gold jewelry items and the tag can be an RFID product identification tag designed to emit a product identification signal where encoded therein is product identification information and the desired ambient display lighting.

The product identification sensor can be placed within the display case or proximate the display case such that the sensor is within range to sense the signal of tags placed within the display case. Alternatively the product identification tag can be a UPC code encoded with the same information and the tag can be manually disposed with respect to a sensor such that the UPC code could be read by the sensor. With either tag and sensor technology the sensor could be disposed remote from the display area and the tags can be manually disposed in close proximate to the sensor before placing the product in the display area in order to adjust the display case lighting. Also, other identification tag and sensor technology such as for example infrared, laser, and ultra sonic can be utilized without departing from the scope of the present invention.

The lighting can be for example a combination or array of LEDs where each LED light element in the array can be controlled to adjust its intensity and the various elements can have various colors that can be selectively turned on in order to selectively create a desired color combination and/or intensity. Alternative technology for the lighting, tags and tag sensors can vary without departing from the scope of the present invention.

In FIG. 1B, display shelf areas 110, open display case areas for meat and produce 112, and closed refrigerated display case areas 114 are shown. Again, depending on the change of products being displayed in these areas there may be a desire to automatically change the lighting in these areas when a new product is placed in the area so that the products can be given the best appearance as possible. Also, the tag and sensor technology can vary depending on the application. For example some technologies may be more conducive for refrigerated display cases.

Referring to FIG. 2, a possible embodiment of a light fixture 200 is shown. The light fixture can be a panel 202 having multiple LEDs 204 of the same color or various colors and the panel can have integral control circuitry 206 operable to vary the intensity of the LEDs and/or selectively illuminate each LED where the integral control circuitry can be electronically manipulated to control which LEDs are illuminated and at what intensity. This and other types of controllable lighting fixtures that are known to ones skilled in the art and can be utilized without departing from the scope of the invention.

Referring to FIG. 3, an embodiment of an automated lighting control system 300 is shown. The present invention is a system for controlling variations in display lighting based on a product being displayed comprising a controllable color variable light source 302 for illuminating the display area. The system further comprises a product identification tag sensor 304 disposed proximate the product display area operable to read product identifying information from a product identification tag 306 located within the sensing range of the product identification tag sensor 304, where the product identification tag 306 is associated with a specific product type, and said product identification sensor has a sensor output signal 308 representative of the product identifying information. The system also includes a controller 310 communicably linked to the color variable light source and having a sensor input 312 communicably linked to receive and interpret the sensor output signal 308 and said controller operable to control the color variable light source to output a color of light responsive to the interpretation of the sensor output signal.

Another embodiment of the invention includes a controllable intensity variable light source for illuminating the display area with varying intensity. A product identification tag sensor can be disposed proximate the product display area and operable to read product identifying information from a product identification tag located within the sensing range of the product identification tag sensor, where the product identification tag is associated with a specific product type, and said product identification sensor has a sensor output signal representative of the product identifying information. The system further includes a controller communicably linked to the intensity variable light source and having a sensor input communicably linked to receive and interpret the sensor output signal and said controller operable to control the intensity variable light source to output an intensity of light responsive to the interpretation of the sensor output signal. The variable light source can be designed to controllably vary its intensity and color. The variable light source can include control circuitry that is electronically controllable by a controller function.

Another embodiment of the invention can be a process including providing a controllable color variable light source in a product display area and disposing a product identification tag sensor proximate the product display area, where said product identification tag sensor is operable to read product identifying information from a product identification tag located proximate the product display area and within the sensing range of the product identification tag sensor, where the product identification tag is associated with a specific product type. The process can further include the steps of: outputting a sensor output signal representative of the product identifying information read from the product identification tag; receiving and interpreting the sensor output signal with a sensor input of a controller communicably linked to the color variable light source; and controlling the color variable light source to output a color of light responsive to the interpretation of the sensor output signal.

The system as described above having a controllable color variable light source can have a white LED light source with a control circuit controllable to vary the intensity and color hue of the illuminated light. The control circuitry can control and/or modulate the voltage to cause the variations in the light source. The light source can be a controllable color variable light source with a multi-color LED array light source having a control circuit controllable to illuminate combinations of individual LEDs in the LED array to obtain a desired ambient color.

As discussed above the product identification tag sensor can be an RFID sensor and the product identification tag can be an RFID tag; or the product identification tag sensor can be a UPC Code sensor and the product identification tag can be an UPC Coded tag. However, the product identification tag sensor can be an infrared sensor and the product identification tag can be an infrared tag; or the product identification tag sensor can be an ultrasonic sensor and the product identification tag can be an ultrasonic tag. Any of the product identification tags can be attached to a product or otherwise associated with the product. For example there can be one tag associated with a group of like item products to be displayed, such as for example a tag attached to a box of items and the retail clerk can place this one tag within the range of a sensor for a given display area in order to control the lighting in the display area where the products contained in the box are to be displayed.

The system as described above can also include a timer having a timer input communicably linked to receive and detect the sensor output signal and said timer operable to output a time-out signal to the controller when the sensor output signal is not detected at the timer input for a preset time duration, and where said controller will control the color variable light source to power-off upon receipt of the time-out signal.

The various adjustable display lighting examples shown above illustrate a novel method for adjusting display lighting to accommodate the product to be displayed. A user of the present invention may choose any of the above adjustable lighting embodiments, or an equivalent thereof, depending upon the desired application. In this regard, it is recognized that various forms of the subject adjustable display lighting examples could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A system for controlling variations in display lighting based on a product being displayed, the system comprising:

a product display area having a controllable color variable light source;

a product identification tag sensor disposed proximate the product display area operable to read product identifying information from a product identification tag located on a product in the product display area, wherein the product identification tag sensor is configured to read the product identification tag automatically upon placement of the product in the product display area, and wherein the product identification tag is associated with a specific product type, and said product identification sensor has a sensor output signal representative of the specific product type of the product; and a controller communicably linked to the color variable light source and having a sensor input communicably linked to receive and interpret the sensor output signal, said controller being operable to control the color variable light source to output a color of light responsive to the interpretation of the sensor output signal;

wherein the color of the light changes automatically upon placement of the product in the display area.

2. The system as recited in claim 1, wherein the product display area is a display case.

3. The system as recited in claim 1, wherein the controllable color variable light source is a white LED light source having a control circuit controllable to vary the intensity and color hue.

4. The system as recited in claim 1, wherein the controllable color variable light source is a multi-color LED array light source having a control circuit controllable to illuminate combinations of individual LEDs in the LED array to obtain a desired ambient color.

5. The system as recited in claim 1, wherein the product identification tag sensor is an RFID sensor, and the product identification tag is an RFID tag.

6. The system as recited in claim 1, wherein the product identification tag sensor is a UPC Code sensor, and the product identification tag is an UPC Coded tag.

7. The system as recited in claim 1, wherein the product identification tag sensor is an infrared sensor, and the product identification tag is an infrared tag.

8. The system as recited in claim 1, wherein the product identification tag sensor is an ultrasonic sensor, and the product identification tag is an ultrasonic tag.

9. The system as recited in claim 1, wherein the product identification tag is attached to a product.

10. The system as recited in claim 1, further comprising:

a timer having a timer input communicably linked to receive and detect the sensor output signal, said timer being operable to output a time-out signal to the controller when the sensor output signal is not detected at the timer input for a preset time duration;

wherein said controller will control the color variable light source to power-off upon receipt of the time-out signal.

11. A method for controlling variations in display lighting based on a product being displayed, the method comprising:

providing a controllable color variable light source in a product display area;

associating each of a plurality of product types with a corresponding light color setting;

disposing a product identification tag sensor proximate the product display area, wherein said product identification tag sensor is operable to read product identifying information from a product identification tag located proximate the product display area and within a sensing range of the product identification tag sensor, wherein the product identifying information identifies a specific product type associated having a corresponding light color setting;

outputting a sensor output signal representative of the product identifying information read from the product identification tag;

receiving and interpreting the sensor output signal with a sensor input of a controller communicably linked to the color variable light source; and controlling the color variable light source to output a the light color setting corresponding to the specific product, responsive to the interpretation of the sensor output signal.

12. The method as recited in claim 11, wherein the product display area is a display case.

13. The method as recited in claim 11, wherein the controllable color variable light source is a white LED light source having a control circuit controllable to vary the intensity and color hue.

14. The method as recited in claim 11, wherein the controllable color variable light source is a multi-color LED array light source having a control circuit controllable to illuminate combinations of individual LEDs in the LED array to obtain a desired ambient color.

15. The method as recited in claim 11, wherein the product identification tag sensor is an RFID sensor and the product identification tag is an RPID tag.

16. The method as recited in claim 11, wherein the product identification tag sensor is a UPC Code sensor, and the product identification tag is an UPC Coded tag.

17. The method as recited in claim 11, wherein the product identification tag sensor is an infrared sensor, and the product identification tag is an infrared tag.

18. The method as recited in claim 11, wherein the product identification tag sensor is an ultrasonic sensor, and the product identification tag is an ultrasonic tag.

19. The method as recited in claim 11, wherein the product identification tag is attached to a product.

20. The method as recited in claim 11, further comprising:

providing a timer having a timer input communicably linked to receive and detect the sensor output signal, said timer being operable to output a time-out signal to the controller when the sensor output signal is not detected at the timer input for a preset time duration; and controlling the color variable light source to power-off with said controller when said controller receives the time-out signal.

21. A system for controlling variations in display lighting based on a product being displayed, the system comprising:

a product display area;

a controllable color variable light source configured to light the display area;

a product identification tag sensor disposed proximate the product display area operable to read product identifying information from a product identification tag proximate a product in the product display area, wherein the product identification tag sensor is configured to read the product identification tag automatically upon placement of the product in the product display area, and wherein the product identification tag is associated with a specific product type, and said product identification tag sensor has a sensor output signal representative of the specific product type of the product; and a controller communicably linked to the color variable light source and having a sensor input communicably linked to receive and interpret the sensor output signal, said controller being operable to control the color variable light source to output a color of light responsive to the interpretation of the sensor output signal;

wherein the product being lighted in the product display area by the controllable color variable light source automatically determines the color of light output by the controllable color variable light source.

22. A method for controlling variations in display lighting based on a product being displayed, the method comprising:

associating each of a plurality of product types with a corresponding light color setting;

detecting product identifying information from a product identification tag on a product proximate a product display area, wherein the product identification tag is associated with a specific product type of the product;

outputting a sensor output signal representative of the product identifying information read from the product identification tag;

receiving and interpreting the sensor output signal with a sensor input of a controller communicably linked to a color variable light source directed to the product display area; and controlling automatically, in response to the sensor output signal, the color variable light source to output a color of light corresponding to the light color setting associated with the product;

wherein placement of the product in the product display area initiates adjustment of the color variable light source directed to the product display area.

23. A system for controlling variations in display lighting based on a product being displayed, the system comprising:

a controllable color variable light source configured to light a product display area;

a product identification tag sensor disposed proximate the product display area operable to read product identifying information from a product identification tag on a product in the product display area, wherein the product identification tag is associated with a specific product type of the product, and wherein said product identification sensor has a sensor output signal representative of the product identifying information; and a controller communicably linked to the color variable light source and having a sensor input communicably linked to receive and interpret the sensor output signal, said controller being operable to control the color variable light source to output a color of light responsive to the interpretation of the sensor output signal representing the product identifying information;

wherein the product in the product display area determines the color of light output by the controllable color variable light source configured to light the product display area.

24. A system for controlling variations in display lighting based on a product being displayed, the system comprising:

a controllable intensity variable light source configured to light a product display area;

a product identification tag sensor disposed proximate a product display area operable to read product identifying information from a product identification tag on a product in the product display area, wherein the product identification tag is associated with a specific product type of the product, and wherein said product identification sensor has a sensor output signal representative of the product identifying information; and a controller communicably linked to the intensity variable light source and having a sensor input communicably linked to receive and interpret the sensor output signal, said controller being operable to control the intensity variable light source to output an intensity of light responsive to the interpretation of the sensor output signal representing the product identifying information;

wherein the product in the product display area determines the intensity of light output by the controllable color variable light source configured to light the product display area.

* * * * *